June 14, 1966 E. A. ANDERSON ETAL 3,255,798
WELD NUT AND METHOD OF PRODUCING THE SAME Original Filed March 6, 1961 2 Sheets-Sheet 1

INVENTORS
EDWARD A. ANDERSON
AUGUST S. CLAUSE
BY Hudson, Boughton,
Williams, David & Hoffmann
ATTORNEYS June 14, 1966  E. A. ANDERSON ETAL  3,255,798
WELD NUT AND METHOD OF PRODUCING THE SAME
Original Filed March 6, 1961  2 Sheets-Sheet 2

INVENTORS
EDWARD A. ANDERSON
AUGUST S. CLAUSE
BY Hudson, Loughton,
Williams, David & Hoffmann
ATTORNEYS

# United States Patent Office 3,255,798
Patented June 14, 1966

3,255,798
WELD NUT AND METHOD OF PRODUCING
THE SAME
Edward A. Anderson, Cleveland Heights, and August S. Clause, Stow, Ohio, assignors to The Lamson & Sessions Co., Cleveland, Ohio, a corporation of Ohio
Continuation of application Ser. No. 93,396, Mar. 6, 1961. This application Oct. 12, 1964, Ser. No. 405,648
3 Claims. (Cl. 151—41.7)

This application is a continuation of application Serial No. 93,396, filed March 6, 1961, and now abandoned.

This invention relates to the production of weld nuts of the kind comprising a metal body of polygonal shape having corner portions and welding projections on such corner portions for use in forming weld junctions for attaching the nut to a support.

An object of the invention is to provide a novel weld nut of the character just mentioned, and a novel method for rapidly and economically producing the novel weld nuts.

In one procedure used heretofore, weld nuts have been produced by forming welding projections on already existing nuts of a standard form. This procedure has the disadvantage that it requires die processing of the articles twice which involves added manufacturing and die costs. There is also the disadvantage that the thread of the tap opening of the standard nut is likely to become distorted during the forming of the welding projections on the nut.

Another procedure for producing weld nuts has been to provide bar stock having longitudinal ribs thereon, and then cut the bar stock into segments and shape the ribs thereof into welding projections. This procedure has various disadvantages including those of requiring the use of bar stock of a special cross-sectional shape and a reworking of the rib portions on the severed segments.

The present invention eliminates these disadvantages and, as another object thereof, provides a novel weld nut and a novel method for producing the same from bar stock of a conventional flat-strip form and by a single handling and die processing of the metal stock.

Still another object is to provide a novel weld nut and a novel method for producing the same from bar stock, and wherein the welding projections comprise portions of bosses formed on the bar by displaced metal, the weld nuts being segments severed from the bar by a transverse shearing thereof through such bosses.

A further object is to provide such a novel weld nut and method wherein the bosses are formed on the bar by indenting corner portions thereof at spaced points therealong and in a manner to cause a push-up displacement of metal into such bosses.

Yet another object is to provide such a novel weld nut and method wherein the welding projections have flat tops and beveled sides sloping away from the flat tops, such flat tops and beveled sides being produced on bosses of a stock strip by movement of a punch into shearing engagement with the strip.

Additionally, this invention provides a novel weld nut stock strip having longitudinal corner portions indented transversely thereof at longitudinally spaced points, and bosses of pushed-up metal at the location of the indentations for forming welding projections on corner portions of polygonal nut bodies severed from the strip.

Other objects, novel characteristics and advantages of this invention will be apparent in the following detailed description and in the accompanying drawings forming a part of this specification and in which, FIG. 1 is a top plan view of a weld nut of the construction provided by this invention and which has been produced by the novel method of this invention;

Figure 1:
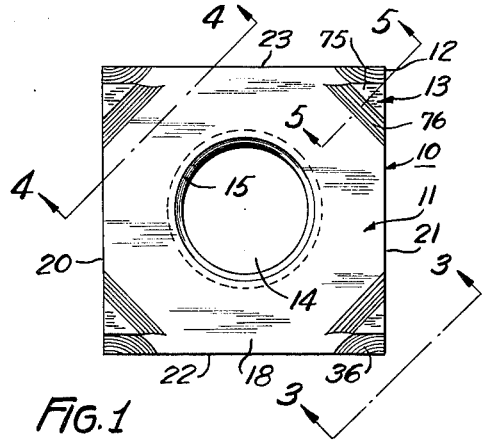
Figure 3:
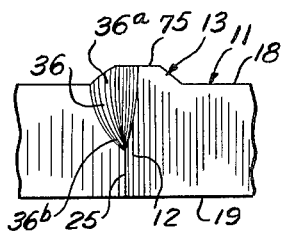
FIG. 3 is an elevation of one corner of the nut when viewed as indicated by the directional line 3—3 of FIG. 1.
Figure 4:
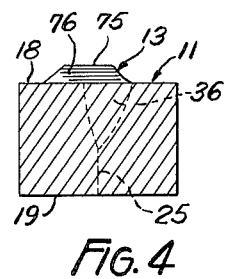
Figure 2:
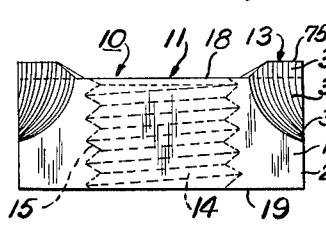
FIG. 2 is a side elevation of the nut.
Figure 5:
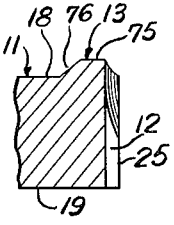
Figure 8:
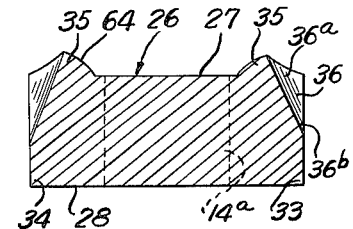
Figure 6:
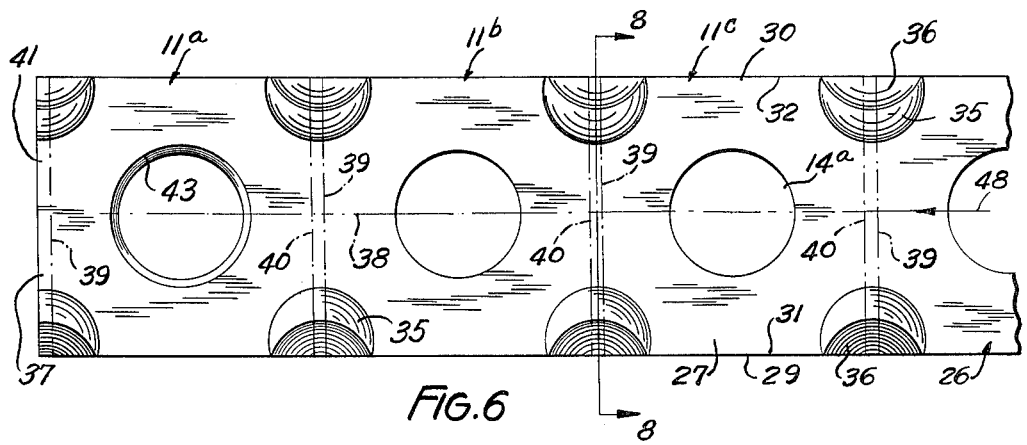
Figure 7:
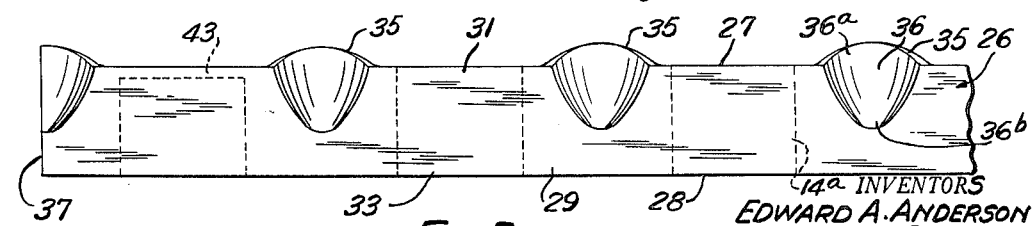
Figure 9:
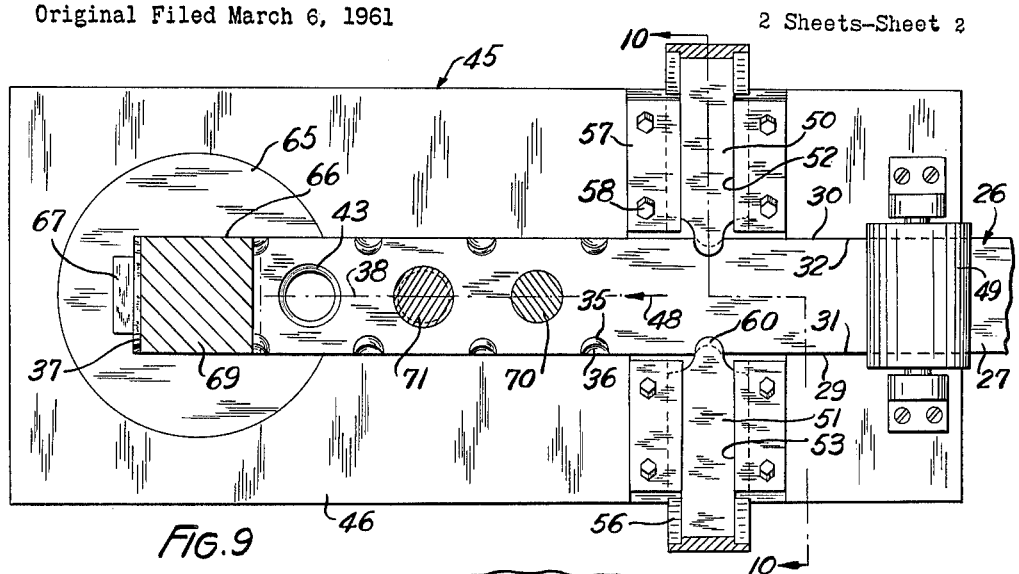
Figure 10:
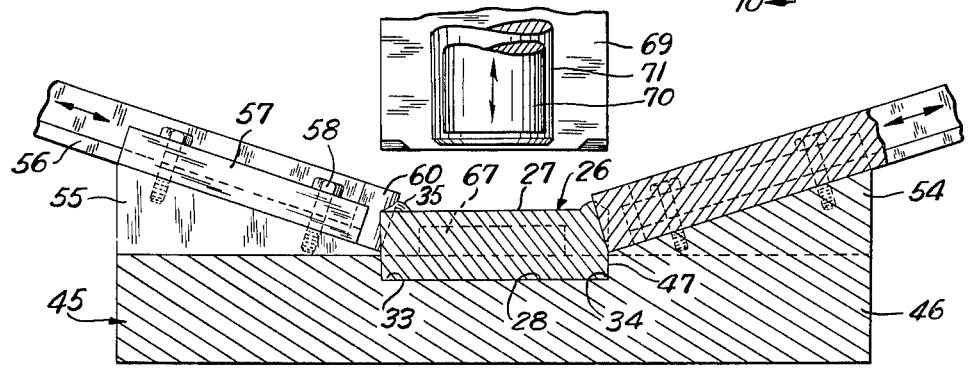
Figure 12:
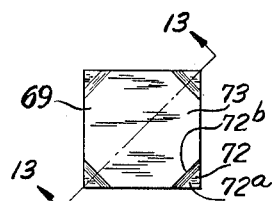
Figure 13:
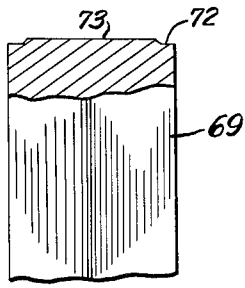
Figure 14:
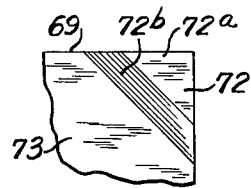
Figure 15:
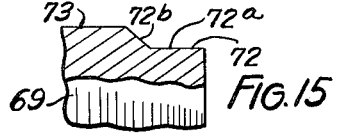
Figure 11:
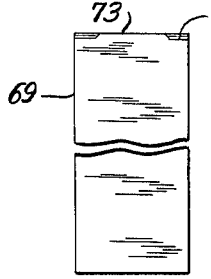

FIGS. 4 and 5 are sectional views taken through the nut on section lines 4—4 and 5—5 of FIG. 1;

FIG. 6 is a plan view of a stock strip used in the novel method and from which the weld nuts are severed;

FIG. 7 is a side elevation of the stock strip of FIG. 6;

FIG. 8 is a transverse section taken through the stock strip on section line 8—8 of FIG. 6;

FIG. 9 is a plan view further illustrating the novel method and showing apparatus used therein;

FIG. 10 is a transverse vertical section taken on section line 10—10 of FIG. 9;

FIG. 11 is a side view of a punch used in the novel method and in the apparatus of FIGS. 9 and 10 for shaping the welding projections and for severing the weld nuts from the strip stock;

FIG. 12 is an end view of the punch;

FIG. 13 is a side view of the punch and with the work-engaging end thereof shown as a sectional view taken on section line 13—13 of FIG. 12;

FIG. 14 is a larger scale partial end view of one of the corner portions of the punch; and FIG. 15 is a larger scale partial sectional view of one of the corner portions of the punch.

As one embodiment of a novel weld nut provided by this invention and produced from strip stock by the novel method, FIGS. 1 to 5 show such a nut 10 as comprising a metal body 11 having a plurality of corner portions 12, and welding projections 13 on such corner portions and located at one end only of the nut. The nut 10 is here shown as being of a quadrangular plan shape having four of the corner portions 12 and four of the welding projections 13. The nut 10 also has an opening 14 extending axially therethrough and provided with a conventional screw thread 15 internally thereof.

For the position in which the weld nut 10 is shown in the drawings, the nut has upper and lower substantially flat end surfaces 18 and 19 surrounding the opening 14 and also has pairs of opposed flat side faces 20, 21 and 22, 23. The welding projections 13 comprise elements projecting axially from the nut body 11 and rising above the upper end surface 18 so as to constitute a group of such elements distributed around the threaded opening 14 in a substantially radially spaced relation thereto. The corner portions 12 have axially extending right-angle corner edges 25 thereon and extending at least part-way therealong and which corner edges are formed by the intersections of various ones of the side faces 20, 21, 22 and 23.

Since the welding projections 13 are formed in a manner peculiar to the novel method of this invention, the shape and manner of forming such projections will be further described in conjunction with such method and in conjunction with apparatus shown in FIGS. 9 and 10 for carrying out the method.

As has been indicated above in a general way, the method employs a conventional form of bar stock which, as shown in FIGS. 9 and 10, is initially in the form of a metal strip 26 having flat parallel longitudinal top and bottom surfaces 27 and 28 and flat parallel longitudinal side faces 29 and 30. The stock strip 26 also has longitudinal right-angle corner portions 31 and 32 extending therealong at opposite edges of the top surface 27, and similar right-angle longitudinal corner portions 33 and 34 extending along opposite edges of the bottom surface 28.

The novel method involves the formation of projections on the strip stock 26 at longitudinally spaced points along the corner portions 31 and 32 and which projections are in the form of bosses 35 rising above the longitudinal top surface 27. The bosses 35 comprise pushed-up metal of the stock strip 26 and are obtained by forming indentations 36 in the corner portions 31 and 32 at longitudinally spaced points therealong. The indentations 36 and the bosses 35 resulting therefrom are here shown as being located in pairs disposed in a directly opposed relation to each other transversely of the stock strip.

FIGS. 6 and 7 of the drawings show a portion of the stock strip 26 on which the bosses 35 have been formed in the relation mentioned above and which includes a lead-end portion 37 from which the nut bodies 11 are severed in succession as explained hereinafter. The bosses 35 are located at spaced intervals along the strip 26 so that, when the strip is cut transversely thereof for severing the same into the nut bodies 11, portions of the bosses 35 will remain on the severed nut bodies to constitute the welding projections 13.

The stock strip 26 also has openings 14a therein at spaced points along the longitudinal center line 38 of the strip and which, in the completed weld nut 10, are the internally threaded openings 14. The stock strip 26 is severed transversely thereof on shear lines 39 and 40 which extend across the strip in a parallel relation and pass through the pairs of bosses 35. When the first nut body 11a is thus severed from the lead-end 37 of the strip 26, the strip is cut transversely on a pair of the shear lines 39 and 40 whereby the nut body is separated from the strip and a scrap segment 41 of metal stock is simultaneously severed from the lead-end. Similarly, when the next succeeding portion of the stock strip 26 becomes the lead-end, the nut body 11b is severed therefrom by again cutting the strip transversely on a pair of the shear lines 39 and 40.

As will be further explained in conjunction with the apparatus of FIGS. 9 and 10, the openings 14a of the stock strip 26 are punched therein after the bosses 35 have been produced so that these openings will not be distorted in the forming of the bosses. The openings 14a are spaced along the longitudinal center line 38 of the stock strip 26 so that each opening is centered in the segment of the stock strip which is to form one of the nut bodies 11. Prior to the cutting of the nut bodies 11 from the stock strip 26, the openings 14a are preferably provided at one or both ends thereof with an annular chamfer 43 which is usually desirable at one or both ends of the threaded opening 14 of the completed weld nut 10.

Any suitable apparatus can be used in carrying out the novel method and one suitable form of such apparatus 45 is shown in FIGS. 9 and 10. The apparatus 45 includes a base 46 having a longitudinal groove therein as a guideway 47 for the stock strip 26 during movement of the latter therealong. The stock strip 26 is advanced in the guideway 47 in the direction indicated by the arrow 48 as by means of a pair of suitable feed rolls 49.

The indentations 36 are formed in the corner portions 31 and 32 of the stock strip 26 by a pair of co-operating inwardly movable die members 50 and 51, in this case, a pair of reciprocably movable die members. The die members 50 and 51 can be actuated by any suitable power means and are here shown as being movable in guideways 52 and 53 which extend in a direction transverse to the longitudinal guideway 47. The guideways 52 and 53 are formed in inclined elevated portions 54 and 55 of the base 46 so that the die members 50 and 51 are movable against the corner portions 31 and 32 and against the side faces 29 and 30 of the stock strip 26 in an inclined relation to the planes of those side faces, as shown in FIG. 10. The die members 50 and 51 are here shown as having flanges 56 thereon, and are retained in their guideways 52 and 53 by suitable cover plates 57 which overlap such flanges and are secured to the elevated base portions 54 and 55 by suitable connecting screws 58.

At the inner end thereof each of the die members 50 and 51 has a stock engaging portion 60 of a suitable shape for forming the indentations 36 in the corner portions 31 and 32 of the stock strip 26 by a squeezing pressure applied in such a manner as to result in the pushed-up bosses 35. The indenting portion 60 is here shown as being convex and of a substantially semicylindrical shape so that element lines thereof are straight lines in the top-to-bottom direction of the die members 50 and 51. The indenting portions 60 thus have a rounded and more or less blunt shape so that when they are pressed into the stock strip 26 from opposite sides thereof they will displace metal in a transverse inward direction of the strip and will cause such metal to be pushed up into the bosses 35 and such bosses are left standing in a projecting relation above the surface 27 when the die members 50 and 51 are retracted.

From FIGS. 6, 7 and 8 of the drawings it will be observed that the indentations 36 formed in the stock strip 26 by the indenting die portions 60 are transversely concave in a direction longitudinally of the strip, and lie in an inclined position so as to extend across the upper pair of corner portions 31 and 32 of the strip without interrupting the lower pair of corner portions 33 and 34. Since the lower corner portions 33 and 34 are not interrupted or distorted during the indenting of the upper corner portions 31 and 32, the nut bodies 11 which are severed from the strip will be of a good regular shape at the lower end thereof represented by the end face 19 and which end extends away from the support plate or the like to which the weld nut is subsequently attached.

It will also be noted from FIGS. 6, 7 and 8 that the indentation recesses 36 have the bottom portions of the concavities thereof lying on straight element lines which extend in an inclined relation to the top surface 27 of the strip and intersect thereabove at points lying in a longitudinal vertical plane which passes through the longitudinal center line 38 of the strip. As shown in FIG. 7, the indentations 36 are generally triangular in shape and are disposed with the wide or base portions 36a thereof in an uppermost position. The wide upper portions 36a of the indentation are also the deeper portions, while the lower ends 36b of the indentations are vanishing portions which intersect the side faces 29 and 30 at points above the plane of the bottom surface 28. In the completed weld nut 10, portions of the indentations 36 remain in the nut body 11 and, as shown in FIGS. 1 to 5, extend upward along the corner edges 25 to the tops of the welding projections 13.

The bosses 35 have a convexly rounded surface 64 on the inner or adjacent sides thereof as shown in FIGS. 6 and 8 and which rounded surface corresponds somewhat in shape with a segment of a sphere. These rounded portions of the bosses 35 result from the inward and upward flow of the metal of the stock strip 26 during the cold-working or swaging action of the indenting portions 60 of the die members 50 and 51 thereon. The bosses 35 are further shaped into the welding projections 13 in a manner explained hereinafter.

The apparatus 45 is shown in FIGS. 9 and 10 as also comprising a die insert 65 mounted in the base 46 at a point spaced from the die members 51 and 52 and having a die orifice 66 across which the lead-end 37 of the stock strip 26 is moved by the feed rolls 49. The die insert 65 is here shown as having a feed stop thereon in the form of a projection 67 located to be engaged by the lead-end 37 of the stock strip when the latter is advanced along the guideway 47.

The die apparatus 45 also includes a main punch 69 for co-operation with the die insert 65 in shearing the nut bodies 11 from the lead-end of the stock strip 26, and piercing and chamfering punches 70 and 71 located between the shearing punch 69 and the indenting die members 51 and 52. The piercing punch 70 operates to form the openings 14a in the stock strip 26, and the chamfering punch 71 operates to form the chamfer 43.

When the stock strip 26 is advanced in the guideway 47 so that the lead-end 37 engages the feed stop 67, the lead-end will then extend in a well-supported spanning relation across the orifice 66 of the die member 65, as shown in FIG. 9. As the shearing punch 69 is moved into the die recess 66 it severs the segment 11ª from the stock strip by cutting the latter on one pair of the transverse shear lines 39 and 40. The movement of the shearing punch 69 into the die member 65 pushes the severed nut body 11 through the die recess 66 from which it drops into a suitable chute or container. The scrap segment 37 falls away from the feed stop 67 during either the forward or return movement of the shearing punch 69.

The punch 69 is also used to accomplish the abovementioned further shaping of the bosses 35 into the welding projections 13. For this purpose, the punch 69 is provided at the work-engaging end thereof with shaping portions 72 located at the corners thereof and disposed in a distributed relation around a flat end face 73. The shaping portions 72 comprise, at each corner of the punch 69, a flat portion 72ª and an inclined beveled portion 72ᵇ. The flat portions 72ª are of a triangular shape and all lie in a transverse plane which is parallel to the end face 73 and normal to the longitudinal center line of the punch. The inclined beveled portions 72ᵇ intersect the flat surfaces 73 and 72ª and slope upwardly and axially away from the surfaces 72ª and toward the longitudinal center line of the punch.

When the punch 69 is advanced into engagement with the stock strip 26 to shear the segment 11ª therefrom, the force used to accomplish the shearing action first causes the die portions 72ª and 72ᵇ of the punch to produce the desired further shaping of the bosses 35 into the welding projections 13. The actuating force with which the punch 69 is moved against the stock strip 26 causes the inclined beveled portions 72ᵇ of the punch to engage and act on the convex portions 64 of the bosses 35 and the flat portions 72ª to engage and act on the tops of the bosses.

The inclined beveled portions 72ᵇ of the punch 69 change the shape of the bosses 35 by pushing up and coining the displaced metal into the desired final shape of the welding projections 13 and thus produce a beveling action on the rounded sides 64 of the bosses. The flat portions 72ª of the punch produce a flattening of the bosses 35 at the top thereof. The further shaping of the bosses 35 thus accomplished results in the provision of a flat top 75 and an inclined flat side surface 76 on each of the welding projections 13.

As shown in the drawings, the welding projections 13 for the finished weld nut 10 have a side surface coplanar with the side face of the weld nut 10 contiguous thereto and the recesses 36 at the corners of the nut 10 are asymmetrical with respect to a diagonal plane extending through the corner edges of the nut so that the depth of the recesses 36 when viewed from the side face of the nut 10 which is coplanar with the side surface of the welding projection 13 is greater than the depth of the recesses 36 when viewed from the adjacent intersecting side face of the nut whereby a major portion of the welding projections 13 are axially supported by a solid portion of the metal body of the nut 10.

From the accompanying drawings and the foregoing detailed description it will now be understood that this invention provides a novel form of weld nut produced from bar stock and a novel method for producing such a weld nut in a rapid and economical manner. It will also be seen that this invention achieves the benefits of using conventional stock strip as the material from which the weld nuts are produced, as well as the advantage of a processing of the material in only one die apparatus. It will be understood also that the size, shape and location of the welding projections and the particular die apparatus used in producing the weld nut can be varied considerably without departing from the principle and spirit of the invention.

Although the weld nut and method of this invention have been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. A weld nut comprising a metal body of quadrangular plan shape having an axial tapped opening, and opposed end faces on first and second ends thereof and surrounding said opening; said nut being usable with said first end connected to a support member by weld junctions and said second end projecting therefrom as a free end; said body also having intersecting side faces and corner portions defined by the intersecting side faces; and axially extending welding projections on said corner portions and projecting from the end face of said first end for forming said weld junctions; said corner portions having recesses therein spaced from the end face of said second end and extending generally axially along said corner portions and onto and along at least a portion of said welding projections, said intersecting side faces defining corner edges extending from said recesses to the end face of said second end; said recesses having bottoms of concavely curved shape when viewed from the corner edges; said welding projections having flat outer end surfaces and a side surface coplanar with the side face contiguous thereto; said recesses being asymmetrical with respect to a diagonal plane extending through said corner edges, the depth of said recesses when viewed from the side face which is coplanar with the side surface of the welding projection being greater than the depth of the recesses when viewed from the adjacent intersecting side face, whereby at least a major portion of said welding projections is axially supported by a solid portion of the metal body of the nut; said welding projections being wholly comprised of metal displaced from said recesses.

2. The method of producing weld nuts of the kind having welding projections extending outwardly from one end face of one end and pairs of opposed side walls, directly from metal bar stock having longitudinally extending sides including first and second oppositely facing sides and third and fourth oppositely facing sides, and longitudinal corners formed by the intersection of said first and second sides with said third and fourth sides comprising: advancing the bar stock in an endwise direction; moving and pressing indenting tool members having curved blunt work engaging surfaces and which are inclined at an acute angle with respect to the plane of the second side of the bar stock against and into the corners formed by the intersection of the second side with the third and fourth sides and against and into limited portions only of said third and fourth sides which are directly below and contiguous to the segments of said corners against which the indenting pressure of said tool members is being applied; confining the extent of the indenting movement so that said tool members form indentation recesses in said limited portions of said third and fourth sides having curved bottoms which are concave as viewed from the third and fourth sides and located inwardly of the planes of said third and fourth sides and extending across and interrupting said corners; directing the indenting pressure along force lines which are inclined to the plane of the second side and the planes of the third and fourth sides so that metal displaced during the formation of the recesses is pushed inwardly relative to said third and fourth sides and upwardly relative to said second side only to form welding bosses disposed outwardly of said second side; repeating such pressure application of indenting tool members to the bar stock at locations spaced apart longitudinally therealong a distance equal to the nut dimension desired between a pair of the opposed side walls of the nut being produced; punching openings in said bar stock for use as tap openings in the weld nuts being produced; flattening the outer ends of said welding bosses to provide flat-contact areas on the outer ends of said welding projection; and severing said bar stock into nut bodies by cutting the bar stock on transverse planes extending through said bosses and said recesses so that portions of said bosses remain on each nut body in a projecting relation to one side face of one side as said welding projections.

3. The method defined in claim 2 wherein the advancing of said bar is carried out as a succession of advance movements each of which locates the lead-end having said bosses thereon in a spanning position across a die opening; the parting of said bosses and the flattening of the outer ends thereof being performed by the same tool member and in the same operation as that by which a nut body is severed from said lead-end.

References Cited by the Examiner
UNITED STATES PATENTS

| | | | |
|---|---|---|---|
| 2,054,187 | 9/1936 | Almdale | 151—41.7 |
| 2,096,623 | 10/1937 | Almdale. | |
| 2,822,850 | 2/1958 | McLaughlin | 151—41.7 |
| 2,909,206 | 10/1959 | Johnson | 151—41.7 |

EDWARD C. ALLEN, *Primary Examiner.*